US006799293B2

(12) United States Patent
Peters et al.

(10) Patent No.: US 6,799,293 B2
(45) Date of Patent: Sep. 28, 2004

(54) SPARSE BYTE ENABLE INDICATOR FOR HIGH SPEED MEMORY ACCESS ARBITRATION METHOD AND APPARATUS

(75) Inventors: Michael J. Peters, Fort Collins, CO (US); James R. Klobcar, Winter Springs, FL (US)

(73) Assignee: Adaptec, Inc., Milpitas, CA (US)

( * ) Notice: Subject to any disclaimer, the term of this patent is extended or adjusted under 35 U.S.C. 154(b) by 387 days.

(21) Appl. No.: 09/884,270

(22) Filed: Jun. 19, 2001

(65) Prior Publication Data

US 2003/0002466 A1 Jan. 2, 2003

(51) Int. Cl.[7] .............................................. G11C 29/00
(52) U.S. Cl. ..................... 714/763; 714/9; 714/785; 711/111; 370/338; 370/352
(58) Field of Search ............................... 714/763, 785, 714/9, 770, 764; 370/338, 352, 350; 711/131, 111

(56) References Cited

U.S. PATENT DOCUMENTS

| | | | |
|---|---|---|---|
| 5,469,558 A | * 11/1995 | Lieberman et al. ......... 395/285 |
| 5,588,112 A | * 12/1996 | Dearth et al. .................. 714/9 |
| 5,802,581 A | 9/1998 | Nelsen ........................ 711/151 |
| 6,014,729 A | 1/2000 | Lannan et al. .............. 711/150 |
| 6,023,748 A | * 2/2000 | Peters et al. ................ 711/151 |
| 6,157,989 A | * 12/2000 | Collins et al. .............. 711/151 |
| 6,505,319 B1 | * 1/2003 | Kodama ...................... 714/752 |

* cited by examiner

Primary Examiner—Guy J. Lamarre
(74) Attorney, Agent, or Firm—Sheridan Ross P.C.

(57) ABSTRACT

A sparse byte enable indicator for high speed memory access arbitration and a memory controller utilizing same is provided. According to the invention, a sparse byte enable indication is provided to the memory controller with or at about the same time that a request for a write to memory is received from a client. In response to receiving the sparse byte enable indication, the memory controller can begin to initiate a read-modify-write sequence. The present invention allows write operations involving less than complete data words in a first block of data to be completed in fewer clock cycles than in connection with controllers that do not utilize a sparse byte enable indication. The present invention is applicable in connection with any device controlling access to memory in systems utilizing error correction code.

22 Claims, 3 Drawing Sheets

SPARSE BYTE ENABLE INDICATOR FOR HIGH SPEED MEMORY ACCESS ARBITRATION METHOD AND APPARATUS

FIELD OF THE INVENTION

The present invention relates to computer memory access arbitration. In particular the present invention relates to the efficient handling of write requests in connection with error correction code.

BACKGROUND OF THE INVENTION

In computer systems utilizing high speed synchronous dynamic random access memory (SDRAM), there is at least some latency between the time a new memory access is requested and the time that data can actually start flowing to or from the memory. This latency is due to the way that SDRAM operates. In particular, before a read or write operation can begin, a bank (row) in the memory must first be activated. Next, a read or write command can be issued along with the remainder of the address that is being accessed. Data transfers can begin only after these steps have been taken.

An additional period latency is involved if an error correction code (ECC) is used. This is because write data must pass through the ECC logic in order to create a syndrome value based on the data that is being written. The data and syndrome value are then written together. The additional processing required by an error correction code typically adds from 10 to 15 clocks of latency during a read-modify-write operation from the start of an access request to the first cycle in which a data transfer occurs.

In many devices that access SDRAM, there are multiple internal clients that may require access to the SDRAM. Often, an arbitration module is provided to determine which of the clients has access to the memory at any given point in time. However, because of the latency described above, there is typically a gap between the end of one client's access to the memory and the beginning of another access to the memory. During this period of latency, the memory interface is unused. This latency reduces the overall performance of the computer system.

Memory controllers that include arbiters to determine which of the clients will be granted access to the memory next, and that track whether that client will be writing to or reading from the memory, have been developed. Such systems, which are often capable of determining the next client to be granted access while a previous access is still in progress, can improve the performance of the computer system. In general, the performance improvement comes from allowing the memory controller to begin the steps required to prepare for the next client access internally while the previous access is still in progress.

The performance of the memory controller may be additionally refined by having the clients provide transaction size information to the arbiter, so that the arbiter can determine when that client's transaction is nearing completion. The arbiter can then determine which client will be granted access next, and can forward the address and read or write information to the memory controller for the next transaction, while a current transaction is still in progress.

In order to improve the reliability of systems that store information in SDRAM, error correction code is often used. In a typical ECC scheme, an 8 bit syndrome value is appended to each 64 bit word of data that is written to the SDRAM. The syndrome value is created based on the 64 bit data word value. When the data and syndrome value are read back from memory, the memory controller calculates a new syndrome value from the data that was read. The new syndrome value is compared to the syndrome value that was also read from the SDRAM. If the syndrome values match, the data is presumed to be correct, and it is passed to the appropriate client. If there is a difference between the syndrome values, an error in the data is indicated. Depending on the algorithm employed and the type of data error, the error may be correctable based on the information provided by the syndrome value.

One drawback of using this type of error correction code occurs in connection with a sparse byte enable condition. A sparse byte enable condition occurs when less than a complete 64 bit word is to be written to memory. A less than complete data word may be received when the address specifying a first word in a block of data to be written is unaligned. A sparse byte enable condition is typically signaled by byte enable bits that are provided with the data. In particular, the byte enable bits signal which of the 8 bytes in the 64 bit block of data are to be written. When a sparse byte enable condition is encountered, the data word cannot be written directly to memory. Instead, a read-modify-write sequence must be used. This sequence is necessary to allow the memory controller to create a new ECC syndrome value to be written to memory along with the data. The new ECC syndrome value is calculated from a combination of the original data read from the memory and the bytes of new data that are to be written. That is, the older data is used as filler to form a complete 64 bit data word. As can be appreciated, the complete data word must be formed before the otherwise incomplete data is stored, in order to calculate a valid ECC syndrome value.

Conventional memory controllers are not informed that a block of data is in a sparse byte enable condition until that block of data is received. Therefore, when the memory controller is expecting to write data, and has prepared for a write operation, additional clocks of latency are incurred if sparse byte enables are received, as the memory controller must terminate the steps begun for a write operation, and instead read old data from the memory.

Therefore, it would be desirable to provide a method and an apparatus for controlling access to memory that remove or reduce the additional period of latency incurred when a write operation involving less than a complete data word is encountered. Furthermore, it would be advantageous to provide a method and an apparatus for controlling access to memory that were inexpensive to implement and reliable in operation.

SUMMARY OF THE INVENTION

In accordance with the present invention, a high speed memory access arbitration method and apparatus that include a sparse byte enable indication are provided. The present invention generally allows a memory interface included as part of a memory controller or RAID controller to appropriately prepare for a write to memory when the first block of data to be written includes less than a complete data word. In particular, the present invention provides a memory interface that, upon receipt of an indication that a first block of data to be written contains less than a complete data word, initiates a read from memory. Therefore, old data read from memory can be available at about the same time the first block of data to be written is received. The old data can be combined with first block of data to be written to form a complete data word, and an ECC syndrome value can be calculated. The complete data word and ECC syndrome value can then be written to memory.

According to an embodiment of the present invention, a sparse byte enable condition is signaled to the memory interface of the controller by a client or device when the client or device issues a write request that involves a first block of data having less than a complete data word. In response to receiving the sparse byte indication, the memory interface initiates a read of old data from the memory. The old data read from memory is combined with the data to be written to form a complete data word. The complete data word includes all of the data to be written as part of the first block of data, and portions of the block of old data read from memory. An error correction syndrome value is calculated from the complete data word, and the complete data word and syndrome value are written to memory.

According to another embodiment of the present invention, a write request is produced in an external device that includes an indication that a first block of data identified in connection with the write request contains less than a complete data word. The write request is provided to a first data interface included in the controller. In response to receiving the write request, the memory interface operates to read a block of old data from a memory. The incomplete first block of data is combined with the block of old data to form a complete data word. The complete data word thus formed includes all of the data within the first block of data to be written, and at least a portion of the old block of data read from memory. An error correction syndrome value is calculated from the newly formed complete data word. The newly formed complete data word and the error correction syndrome value are then written to the memory.

According to still another embodiment of the present invention, a memory controller having a memory interface for use in connection with high speed arbitration is provided. The memory interface operates to initiate a read from memory in response to receiving an indication that a first block of data to be written to memory contains less than a complete data word. The data read from memory is combined with the first block of data to be written to form a complete data word. An error correction syndrome value is calculated for the complete data word, and the complete data word and error correction syndrome value are written to the memory.

The method and apparatus of the present invention allow a memory controller, including a RAID controller, to efficiently process write operations involving error correction code, and involving incomplete data words. In particular, the present invention provides for a sparse byte enable indication that is provided to the memory controller interface of the controller as part of or associated with a write request. The sparse byte enable condition indication allows the memory interface to first read old data from memory before the data to be written arrives at the memory interface, thereby reducing or eliminating the latency that would be encountered if the memory interface was not aware of the sparse byte enable condition until the first block of data arrived at the memory interface. Accordingly, the present invention improves the efficiency and speed of controllers.

Additional advantages of the present invention will become readily apparent from the following discussion, particularly when taken together with the accompanying drawings.

DETAILED DESCRIPTION

Figure 1:
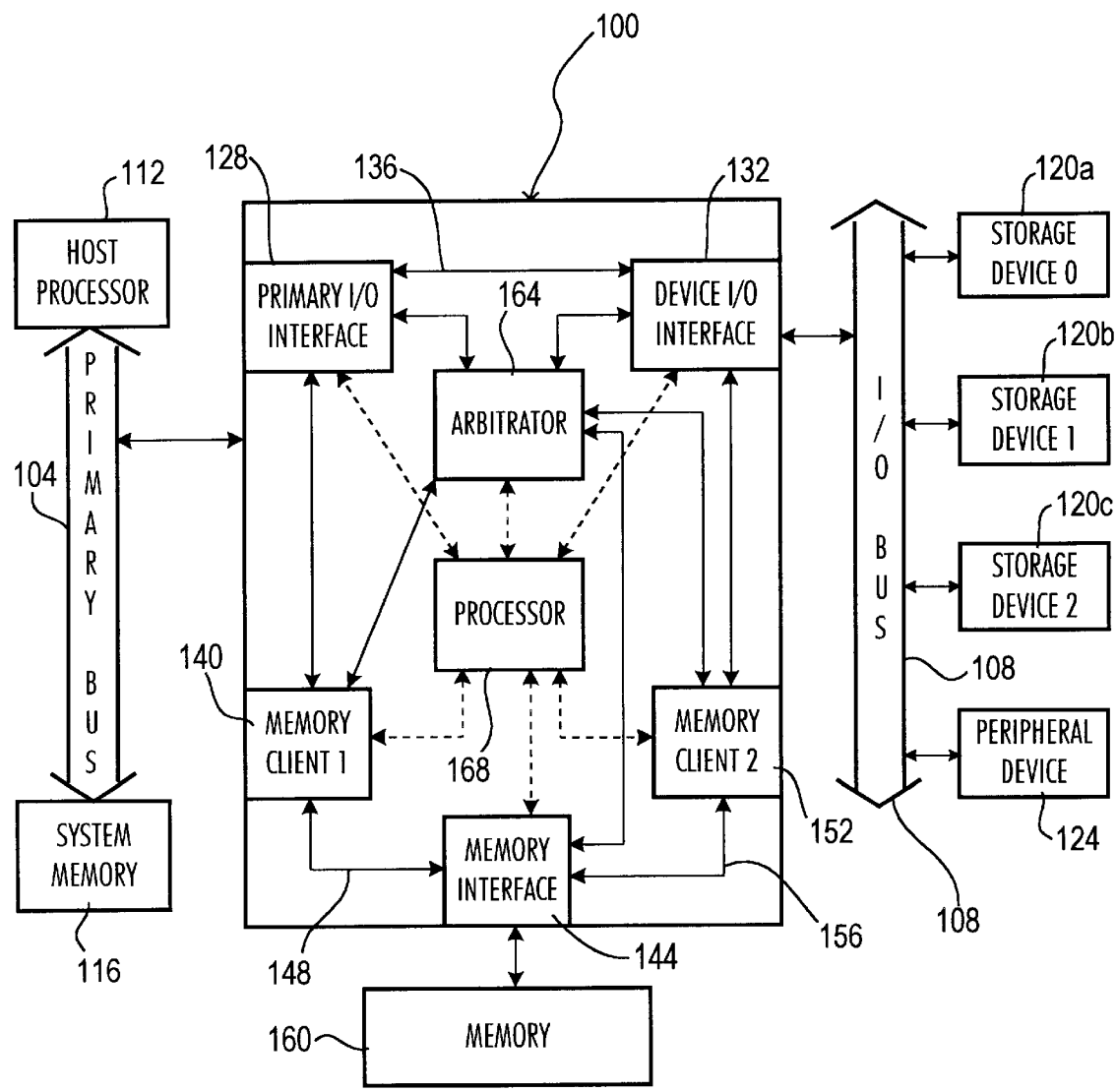
FIG. 1 depicts in functional block diagram form a controller in accordance with an embodiment of the present invention.

With reference now to FIG. 1, a controller 100 in accordance with an embodiment of the present invention is illustrated. The controller 100, in a typical application, is interconnected to a primary system bus 104 and to an I/O bus 108. For example, the controller 100 may function as a RAID controller. An example of a primary bus is a peripheral component interconnect (PCI) bus, while an example of an I/O bus is a Small Computer System Interface (SCSI) bus. In general, the primary bus 104 is connected to a host processor 112 and to system memory 116. The I/O bus 108 may be interconnected to various storage devices 120 and peripheral devices 124. The various devices 112, 116, 120 and 124 illustrated as being interconnected to the controller 100 through the buses 104 and 108 are provided for exemplary purposes only, and it should be appreciated that additional or alternative configurations are possible. In particular, when the controller 100 is used as a controller for a redundant array of inexpensive (or independent) disks (RAID) system, a plurality of storage devices 120 will be interconnected to the controller 100 through the I/O bus 108.

The controller 100 may include a primary I/O interface 128 for interconnecting the controller 100 to the primary bus 104. A device I/O interface 132 may be provided for interconnecting the controller 100 to the I/O bus 108. A data line 136 may be provided to interconnect the primary I/O interface 128 to the device I/O 132.

A first memory client 140 is interconnected to a memory interface 144 by a signal line 148. A second memory client 152 is interconnected to the memory interface 144 by a signal line 156. In general, the memory clients 140 and 152 perform various operations on data passed to and from memory 160 interconnected to the controller 100 through the memory interface 144. For example, the memory clients 140 and 152 may initialize data in the memory 160, perform error correction code checks, verify a region of memory, move data from the primary I/O interface 128 to the memory interface 144 for storage in the memory 160, perform various operations on data, including producing ECC syndrome values, and calculate RAID parity values.

The controller 100 is also provided with an arbitrator (or arbiter) 164. In general, the arbitrator 164 receives signals from clients (e.g., the memory clients 140 and 152) of the controller 100 or external devices (e.g., the host processor 112 or storage devices 120) requesting access to the memory 160. The arbitrator 164 generally prioritizes the requests for access to determine the order in which access to the memory 160 will be granted. A processor 168 or XOR accelerator (not illustrated) or both may be provided to coordinate and control the operation of the various components of the controller 100. For example, the processor 168 may control the distribution of data across various storage devices, for example storage devices 120a, 120b and 120c, in accordance with the particular RAID storage scheme being implemented.

The controller 100 may be implemented as a card or daughter board interconnected to the primary bus 104 provided as part of the system board of a host computer, or may be part of the system board (or mother board) itself. Furthermore, various of the functional components described in connection with the controller 100 may be implemented in one or a number of interconnected integrated circuits.

Figure 2:
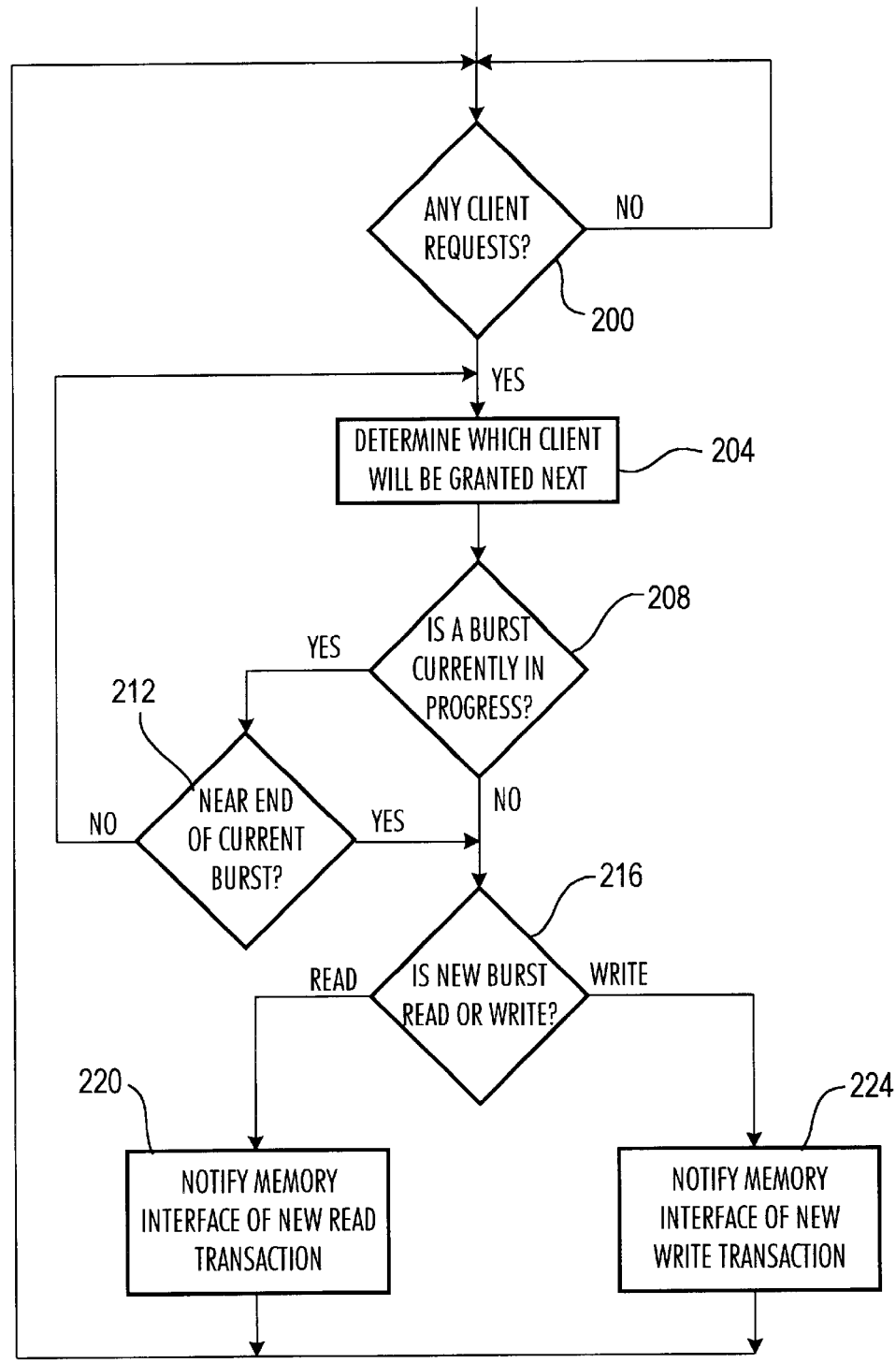
FIG. 2 is a flowchart illustrating the operation of a prior art controller.

With reference now to FIG. 2, a flowchart illustrating the operation of a controller arbitrator in accordance with the prior art is illustrated. In general, an initial check is made for client requests (step 200). If no client request is detected, the system idles at this initial state, to await a client request. If a client request has been received, the arbitrator determines which client will be granted access next (step 204). Then, the arbitrator determines whether a data burst is currently in progress (step 208). If a data burst is currently in progress, a determination is next made as to whether the current data burst is nearly completed (step 212). For example, the arbitrator may determine whether a selected number of clocks or less are required before the current data burst is completed.

If the current data burst is not near completion, the arbitrator returns to step 204, and the determination of which client will be granted next is reassessed. Then, at step 208, if a data burst is not currently in progress, or if completion of a current burst is near, the system proceeds to determine whether the new burst of data (i.e. the burst of data associated with the client that will be granted access to a memory next) involves a read from memory or a write to memory (step 216). If the data involved in the next client's request will be read from the memory, the arbitrator signals the memory interface to prepare for a new read transaction (step 220). Alternatively, if the data associated with the next client's request will be written to the memory, the arbitrator signals the memory interface to prepare for a new write transaction (step 224).

From the above description, it can be appreciated that, in response to receiving a request for a write transaction, the prior art arbitration scheme prepares the memory interface to write, without regard to whether the first block of data involved in the write operation contains a complete data word. Therefore, as described in the background of the invention section above, the memory interface may have to abort the write transaction, and instead prepare for and execute a read from memory in order to combine the partial data word to be written to memory with the old data word in memory, thereby forming a complete data word and allowing a new ECC syndrome value to be calculated. The additional steps required when a partial data word is to be written to memory in connection with the conventional arbitration scheme results in a delay in completion of the write operation.

Figure 3:
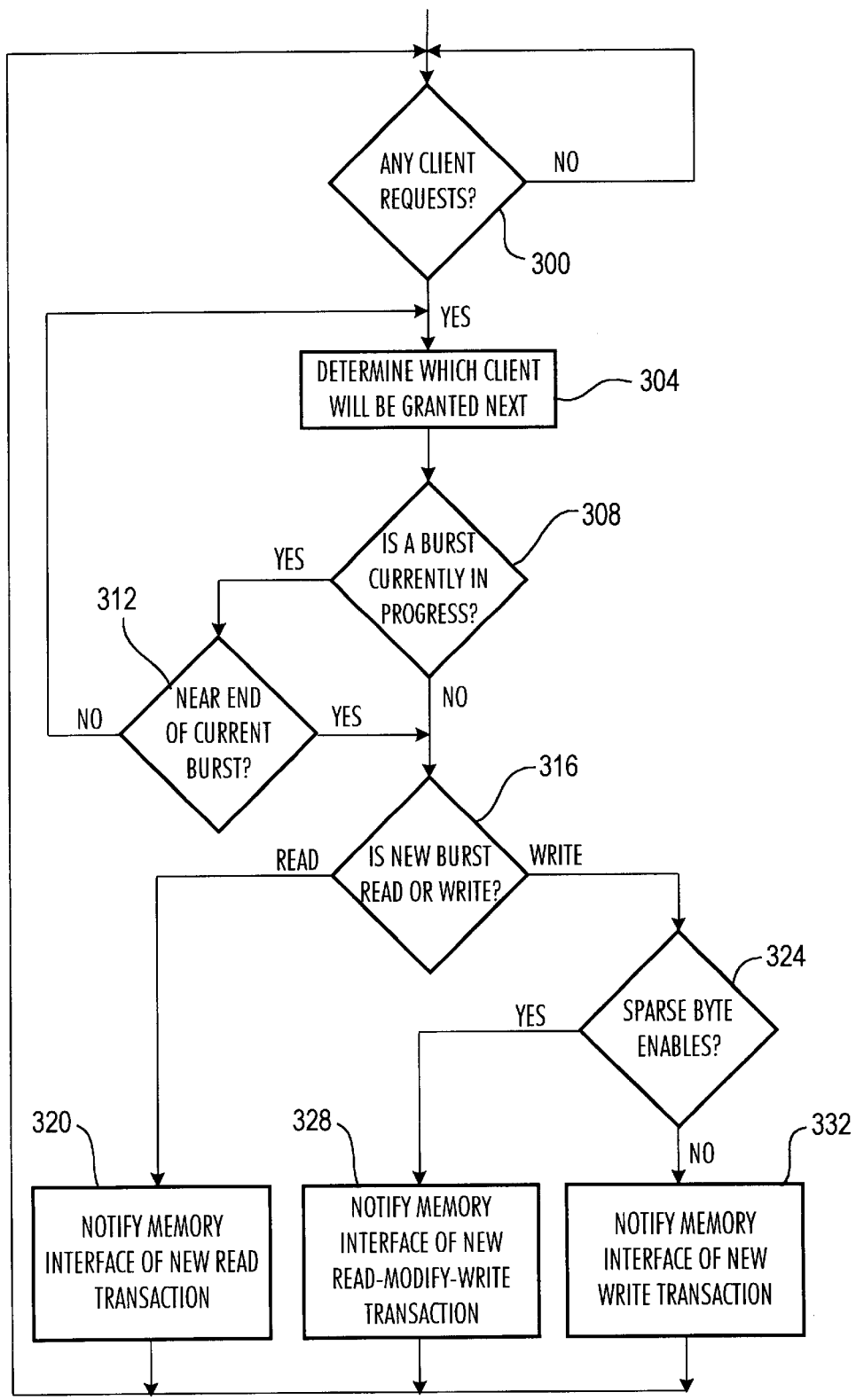
FIG. 3 is a flowchart illustrating operational aspects of a controller in accordance with an embodiment of the present invention.

With reference now to FIG. 3, the operation of a memory interface 100 in accordance with the present invention is illustrated. Initially, at step 300, the arbitrator 164 of the controller 100 determines whether there are any pending client or external device requests. The arbitrator 164 continues in this state until a client or external device request is received, at which point the arbitrator 164 proceeds to determine which client or external device will be granted access to the memory interface 144 next (step 304).

The arbitrator 164 then determines whether a read or write operation in connection with a burst of data is currently in progress (step 308). If a data burst is currently in progress, the arbitrator 164 determines whether the end of the burst is near (step 312). If the end of the current data burst is not near, the arbitrator 164 returns to step 304 to reassess which client will be granted access next. If the end of the current burst is near, or if no data burst is in progress, the arbitrator 164 determines whether the request associated with the next client or device to be granted access involves a read or a write operation (step 316). Accordingly, it can be appreciated that steps 300–316 of the present invention correspond to steps 200–216 of the prior art controller, and in particular the prior art arbitrator.

If the request concerns a read, the arbitrator 164 notifies the memory interface 144 of a new read transaction (step 320). Accordingly, step 320 of the present invention corresponds to step 220 of the conventional controller.

The memory interface 144 of the present invention differs from the conventional memory interface if the data request of the next client or external device to be granted access to the memory 160 concerns a write. In particular, the arbitrator 164 of the controller 100 of the present invention determines whether the write request includes or is associated with a sparse byte enable indication (step 324). If the request for access to the memory 160 includes or is associated with a sparse byte enable indication, the arbitrator 164 notifies the memory interface 144 of a new read-modify-write transaction (step 328). As part of the read-modify-write transaction, the memory interface 144 first reads the old data from the memory 160, so that the old data is available when the first block of data to be written to the memory 160 is received by the memory interface 144. The controller 100, and in particular the memory interface 144, then combine or merge the partial block of data with the old data to form a complete data word, and calculate a new ECC syndrome value.

In combining the partial data word with the old word in memory, those bytes of the incomplete data word that are enabled (i.e. that contain information for storage in the memory) are retained, while each non-enabled byte of the incomplete data word is filled with a byte of the old data read from memory. This is necessary because the data held in memory in connection with error correction code must always be known in order for the error correction function to operate correctly. That is, the ECC syndrome value depends on all of the bytes included in a data word. If an ECC syndrome value is calculated from a partial data word, and that partial data word and syndrome value are stored in memory, the non-enabled bytes are not written to memory. Therefore, when the data word is retrieved from the cache, the partial data word and the bytes of old data that were not overwritten will be included in that data word. Furthermore, the syndrome value calculated upon retrieval of the data word will not match the previously calculated syndrome value, and an error will be indicated.

If a sparse byte enable signal is not detected at step 324, the arbitrator 164 notifies the memory interface 144 of a new write transaction (step 332). The controller may then prepare for and execute a write operation.

TABLE 1

| Clock Cycle # | Conventional Controller Events | New Controller Events |
|---|---|---|
| 1 | write in progress for client #1 | write in progress for client #1 |
| 2 | arbiter gets write request from client #2 | arbiter gets write request from client #2 |
| 3 | write in progress nearing completion | write in progress nearing completion |
| 4 | arbiter notifies memory interface of pending write (no notification of sparse byte enables) | arbiter notifies memory interface of pending write with sparse byte enables |
| 5 | memory interface waits for client #1's write to complete | memory interface issues activate command to memory based on starting address from client #2 |

TABLE 1-continued

| Clock Cycle # | Conventional Controller Events | New Controller Events |
|---|---|---|
| 6 | memory interface waits for client #1's write to complete | wait cycle (required by DRAM protocol), client #1's write continues |
| 7 | memory interface waits for client #1's write to complete | wait cycle (required by DRAM protocol), client #1's write completes |
| 8 | memory interface waits for client #1's write to complete | memory interface issues read command to memory for client #2's read-modify-write sequence, client #1's write continues |
| 9 | memory interface waits for client #1's write to complete | client #1's write continues while memory begins process of retrieving read data for client #2 |
| 10 | memory interface waits for client #1's write to complete | client #1's write continues while memory continues process of retrieving read data for client #2 |
| 11 | write for client #1 completes | write for client #1 completes while memory continues process of retrieving read data for client #2 |
| 12 | memory interface sees first write data and byte enables from client #2 | read data for client #2 is received by memory interface |
| 13 | memory interface issues activate command to memory based on starting address from client #2 | memory interface terminates read and merges read data with write data |
| 14 | wait cycle (required by DRAM protocol) | memory interface calculates new syndrome value |
| 15 | wait cycle (required by DRAM protocol) | memory interface issues write command and first quadword of write data for client #2 |
| 16 | memory interface issues read command to memory for client #2's read-modify-write sequence | memory interface retrieves second quadword of write data for client #2 |

With reference now to Table 1, a comparison of the operation of a controller according to the prior art and a controller 100 including an arbitrator 164 in accordance with the present invention is illustrated. In particular, the operation of a conventional controller in response to a write request is compared to the operation of an embodiment of the present invention in response to an identical request. Initially, at clock cycle #1, a write is in progress in both the old controller and in the controller 100 in accordance with the present invention. At clock cycle #2, a write request is received from client #2. With respect to the old controller, the write request does not include or is not associated with a sparse byte enable condition indication. With respect to the new controller 100, the write request includes an indication that the first block of data that will be written contains less than a complete data word. For example, where a complete data word consists of 64 bits of data (i.e. a quadword, or a word that contains 8 bytes of information) a block of data containing less than a complete data word would include 7 bytes of information or less. When the data itself is transmitted, a byte enable bit is set high for each byte of the data word containing information. However, to obtain an indication that the data word is not complete prior to receipt of the information itself, such a signal must be included in the request from the client to write information. Alternatively, the indication may be provided with any other message provided to the memory interface 144 in advance of the data itself. The indication may consist of a bit in a predetermined position among a series bits that is, for example, set high to indicate an incomplete data word, and low to indicate a complete data word. As a further alternative, the byte enable bits themselves may be provided to the controller in advance of the data.

At clock cycle #3, the write in progress in connection with client #1 is nearing completion with respect to both the conventional controller and the controller 100 in accordance with the present invention. At clock cycle #4, the arbitrator notifies the memory interface that a write request from client #2 is pending. This notification is provided with respect to both the conventional controller and the controller 100 in accordance with the present invention. However, the controller 100 of the present invention also notifies the memory interface 144 that the first block of data to be written contains less than a complete word (e.g., contains less than a full 64 bit word or quad word).

At clock cycles 5–10, the memory interface of the conventional controller waits for client number #1's write to complete. In contrast, the memory interface 144 of the controller 100 in accordance with the present invention issues an activate command to the memory 160 based on the starting address for the write operation received from client #2 at clock cycle #5. At clock cycles #6 and #7, the memory interface 144 of the controller 100 in accordance with the present invention waits, as required by typical DRAM protocol. At clock cycle #8, the memory interface 144 of the present invention issues a read command to the memory 160 to initiate the read-modify-write sequence in connection with the write operation requested by client #2. At clock cycles #9 and #10, the memory 160 of the controller 100 begins the process of retrieving (i.e. reading) data requested by client #2. It will be noted that during the above described activity for clock cycles #5–#10 in connection with the controller 100 of the present invention, the write requested by client #1 continues.

At clock cycle #11, the write operation for client #1 completes with respect to both the conventional controller and the controller 100 in accordance with the present invention. Both controllers likewise receive the first write data in connection with the write request from client #2 at clock cycle #12. Clock cycle #12 is also the first time that the conventional controller receives an indication that the first block of data contains less than a complete data word. That is because the block of data includes the byte enables that notify the controller that the data word is less than complete. With respect to the controller 100 in accordance with the present invention, at clock cycle #12 the read data for client #2 is received from memory by the memory interface 144.

At clock cycle #13, the conventional controller issues an activate command to a memory interface based on the starting address received from client #2, and after wait cycles at clock cycles #14 and #15, issues a read command in connection with the read-modify-write sequence for client #2's write request.

At clock cycle #13, the memory interface 144 of the controller 100 in accordance with the present invention terminates the read operation and merges the data read from memory 160 with the incomplete data block received in connection with the write operation for client #2. In general, all bytes of the block of data to written that are not enabled are overwritten with old data from memory 160. The bytes of data within the first block of data to be written with byte enables activated are not overwritten. In this way, a complete data word is formed. At clock cycle #14, the memory interface 144 of the controller 100 calculates a new ECC syndrome value from the complete data word formed at clock cycle #13. The memory interface 144 of the controller 100 issues a write command to write the complete data word to memory 160, and also retrieves a second block of data, if present, in connection with the write request from client #2. At clock cycle #16, the second block of data is received at the memory interface 144 of the controller 100.

From the above description, it is apparent that the conventional controller did not issue a command to retrieve or read all of the data from memory until clock cycle #16, while the controller 100 in accordance with the present invention issued that command at clock cycle #8. Therefore, it can be appreciated that the controller 100 in accordance with the present invention saved 8 clock cycles as compared to the conventional controller. In particular, the controller 100 of the present invention was able to initiate a read from memory before the first block of data arrived at the controller 100. This is because, according to the present invention, an indication that the first block of data contains less than a complete data word is provided to the controller 100 during or about the same clock cycle that the controller 100 receives the write request from the client (client #2 in the example given above). In contrast, the conventional controller must wait until the first block of data is actually received to ascertain that the block of data contained less than a complete data word.

Furthermore, the savings in clock cycles provided by the controller 100 of the present invention would be even greater as compared to a controller that took steps to perform a write operation after receiving the write request. This is because the conventional controller would then have to abort the write request and instead initiate the read from a memory.

The present invention is applicable to memory controllers used in connection with computer systems using error correction code. The controller of the present invention is particularly useful in connection with the control of RAID storage systems. However, its application is not so limited. For example, the present invention may be used in connection with general memory controllers, bridges between communication buses and any device controller utilizing cache memory in connection with error correction code. Furthermore, although the description above has referred to a DRAM memory cache, it will be appreciated that the present invention can be used in connection with any type of rewritable memory, including RAM, SDRAM and SRAM.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiment described hereinabove are further intended to explain the best mode presently known in practicing the invention and to enable others skilled in the art to utilize the invention in such or in other embodiments and with various modification required by their particular application or use of the invention. It is intended that the appended claims be construed to include the alternative embodiments to the extent permitted by the prior art.

What is claimed is:

1. A method for efficiently writing data to memory in connection with error correction code, comprising:

providing a sparse byte enable signal to a memory interface, wherein said sparse byte enable signal is related to an amount of data included in at least a first word of said data to be written, before said data to be written is provided to said memory interface, wherein said sparse byte enable signal is provided as part of a request to write said data to memory;

in response to receiving said sparse byte enable signal, said memory interface initiating a read of old data from said memory; and after said initiating a read of old data from said memory, receiving at said memory interface said first word of said data to be written.

2. The method of claim 1, wherein a complete data word includes 64 bits of data.

3. The method of claim 1, wherein said sparse byte enable signal comprises an indication of enabled bytes in a first word of said data to be written.

4. The method of claim 1, further comprising:

receiving said data to be written at said memory interface;

merging said data to be written with said old data to create a complete data word;

calculating an error correction syndrome value from said complete data word; and writing said complete data word and said error correction syndrome value to said memory.

5. A method for controlling computer memory, comprising:

receiving at a first memory interface a request to write first data to said memory;

receiving at said first memory interface a sparse byte enable indication, wherein said sparse byte enable indication signals that an incomplete data word is to be written in connection with a first block of said first data, and wherein said sparse byte enable indication is received prior to said incomplete data word;

in response to receiving at said first memory interface said sparse byte enable indication initiating a read of a complete word of old data from said memory;

after said initiating a read of a complete word of old data from said memory, receiving at said first memory interface said incomplete data work;

combining said incomplete data word of said first block of data with said complete word of old data to form a modified complete data word, wherein said modified complete data word includes all of said incomplete data word of said first block of said first data and a portion of said complete word of old data;

calculating a first error correction syndrome value from said modified complete data word; and writing said modified complete data word and said first error correction syndrome value to said memory.

6. The method of claim 5, wherein said indication tint an incomplete data word is to be written in connection with a first block of said data is received as part of said request to write data to said memory.

7. The method of claim 5, wherein said request is received from a first client interconnected to said first memory interface by a communication bus.

8. The method of claim 5, further comprising:

reading said modified complete data word and said first error correction syndrome value from said memory;

providing said modified complete data word to at least one of a first input/output interface and a second input/output interface.

9. The method of claim 8, wherein said at least one of said that input/output interface and said second input/output interface is interconnected to a storage device.

10. The method of claim 5, wherein a write operation is initiated in response to a write request for which no indication that an incomplete data word is to be written in connection with a first block of data is received.

11. The method of claim 5, further comprising:

reading said modified complete data word and said first error correction syndrome value from said memory;

calculating a second error correction syndrome value from said modified complete data word as read from said memory; and comparing said first error correction syndrome value to said second error correction syndrome value.

12. The method of claim 11, wherein said modified complete data word is discarded if said first and second error correction syndrome values are not equal.

13. The method of claim 11, wherein said modified complete data word and said first error correction syndrome value are provided to an external device if said first and second error correction values are equal.

14. The method of claim 6, wherein a complete data word comprises a first number of bytes, wherein said incomplete data word includes less than said first number of bytes, and wherein said combining said incomplete data word of said first block of data with said complete word of old data comprises adding one or more bytes from said complete word of old data to said incomplete data word to obtain a new data word having said first number of bytes, said new data word comprising said modified complete data word.

15. The method of claim 5, wherein said syndrome value is calculated by performing an XOR operation.

16. The method of claim 5, wherein a complete data word comprises a 64 bit word.

17. A computer memory controller, comprising:

a primary input/output interface;

a device input/output interface interconnected to said primary input/output interface;

at least a first memory client interconnected to said primary input/output interface;

a memory interface interconnected to said memory client and to said device input/output interface;

memory interconnected to said memory interface; and an arbitrator, wherein in response to a sparse byte enable signal received as part of a write request said memory interface initiates a read operation in preparation for calculating an error correction syndrome value, and wherein said read operation is initiated prior to said memory controller receiving data associated with said write request.

18. The computer memory controller of claim 17, wherein said read operation comprises reading old data stored in said memory.

19. The computer memory controller of claim 18, wherein said data associated with said write request is combined with said old data to form a complete data word.

20. The computer memory controller of claim 19, wherein said at least a first memory client calculates an error correction syndrome value from said complete data word.

21. The computer memory controller of claim 20, wherein said error correction syndrome value and said complete data word are stored in said memory.

22. The computer memory controller of claim 17, wherein data associated with said write request is stored in a plurality of storage devices interconnected to said computer memory controller.

* * * * *